United States Patent [19]

Perdomini et al.

[11] 4,436,755

[45] Mar. 13, 1984

[54] SEPARATION OF FRUIT JUICE WITH FIBERS OF AN OLEFIN POLYMER

[75] Inventors: Luciano Perdomini; Elia Tonon, both of Verona; Lanfranco Paronetto, Negrar, all of

[73] Assignees: Montedison S.p.A.; Chimici Perdomini S.p.A., both of Milan, Italy

[21] Appl. No.: 343,174

[22] Filed: Jan. 27, 1982

Related U.S. Application Data

[63] Continuation of Ser. No. 121,024, Feb. 13, 1980, abandoned.

[30] Foreign Application Priority Data

Feb. 14, 1979 [IT] Italy ................ 20188 A/79

[51] Int. Cl.³ .................... C12G 1/00; A23L 2/02
[52] U.S. Cl. .................... 426/15; 426/599; 426/422; 426/489
[58] Field of Search ............. 426/15, 422, 489, 599

[56] References Cited

U.S. PATENT DOCUMENTS

| | | | |
|---|---|---|---|
| 2,823,126 | 2/1958 | Little | 426/422 |
| 3,083,104 | 3/1963 | Celmer | 426/422 X |
| 3,740,383 | 6/1973 | Gabellieri et al. | 260/96 X |
| 3,770,856 | 11/1973 | Ueki et al. | 260/33.6 UA X |
| 3,808,091 | 4/1974 | Aoki et al. | 264/13 X |
| 4,002,796 | 1/1977 | Baldi et al. | 428/375 |

FOREIGN PATENT DOCUMENTS 1392667  4/1975  United Kingdom .

OTHER PUBLICATIONS

Amerine et al., The Technology of Wine Making, 3rd ed., The Ayi Publishing Co. Inc., Westport, Conn., 1972, (pp. 309–318).

*Primary Examiner*—David M. Naff

[57] ABSTRACT

Fruit juice is separated from fruit material containing solids in increased yield and quality by adding fibers of an olefin polymer such as polyethylene or polypropylene to the fruit material and separating juice from the mixture of fibers and fruit material. The fibers preferably have a surface area of at least 1 $m^2/g$, a mean length of 0.5–5 mm and a mean diameter of 1 to 500 microns.

8 Claims, No Drawings

SEPARATION OF FRUIT JUICE WITH FIBERS OF AN OLEFIN POLYMER

This is a continuation of application Ser. No. 121,024 filed Feb. 13, 1980, now abandoned.

BACKGROUND OF THE INVENTION

One of the wine-making techniques normally followed consists in subjecting the grapes, either stalked or unstalked, to a first pressing operation in wine-presses or "unstalking-pressing machines", and then subjecting the pressed product to squeezing in special continuous presses, or in discontinuous presses, in order to obtain, under growing pressures, different must fractions (must flower, second squeezing must) and solid pressed grape dregs as a solid residue. The must is then clarified by adding adsorbing materials (i.e.; silica gel, bentonite, jellies, etc.), to it, filtered and sent to fermentation.

At the end of fermentation, the fermented must is separated from the dregs or lees by either decanting or filtering.

According to another method, the unstalked grapes, after crushing in the squeezing machines, are directly conveyed to fermentation together with the skins and other solid constituents of the grapes. At the end of the fermentation, the greater part of the fermented must is separated by decanting while the remainder is extracted from the solids or semi-solid residue consisting of skins, grape-stones, mucilages, etc., by squeezing the solid or semi-solid remainder in the above-mentioned presses.

THE PRESENT INVENTION

One object of this invention is to provide an improved method for separating liquid fruit juices, either fermented or unfermented, from the solid and/or semi-solid materials resulting from extraction of the juice from the fruit, which process is not only simple and economical but also has unexpected advantages with regard to the yields and quality of the products obtained.

A more specific object of the invention is to provide an improved process for separating improved yields of high quality juices and grape musts from the solids and semi-solids resulting from the processing of grapes to juices, musts or wine.

These and other objects which will appear hereinafter are achieved according to this invention by effecting the separation of the fruit juices in the presence of fibrous materials consisting of olefin polymers having a specific surface area of at least 1 sq.mt./g.

In a presently preferred embodiment of the invention, the fibrous materials are used in admiture with the solid materials or with the liquid/solid systems from which the liquid phase is to be separated, and are preferably used in the form of single fibers of a mean length of between 0.5 and 50 mm, and a mean diameter (or smaller dimension) comprised between 1 and 500 microns.

Such single fibers are known as "fibrils", "fibrids" or "plexofilamentary fibrids", and have been suggested for use in the preparation of synthetic and semi-synthetic papers as substitutes for cellulose. They show either an elongated, tubular or ribbon-like shape, with one of the dimensions smaller than the other two, and sometimes are connected with each other in the form of a tridimensional net.

Methods for the preparation of the single fibers are described, for instance, in British Pat. Nos. 868,651, 891,943, 1,262,531, 891,945 and 1,287,917; in German Patent Applications Nos. 2,208,553 and 2,343,543; in Belgian Pat. No. 789,808; U.S. Pat. Nos. 3,770,856, 3,740,383 and 3,808,091; in Italian Pat. No. 947,919, and in British Pat. No. 1,471,097.

However, although less preferred, for the purposes of this invention, there may be used, advantageously, single fibers of either greater or smaller size than that mentioned above, as well as fibrous materials consisting of aggregates of such fibers (for instance in the form of so-called "plexofilaments").

The solid or semi-solid products that occur during processing of fruit to juice are understood to comprise, in this instance, both the starting or original fruits from which the squashed juices are separated, as well as the non-liquid products that are found dissolved, suspended or somehow dispersed in said juices, both as constituent parts of the fruits themselves, as well as products of subsequent operations to which the juice may be subjected, such as, for example, alcoholic fermentation.

Thus, in the case of the transformation of grapes to liquid products such as juices, musts or wine, the solid or semi-solid products that occur and may be conveniently separated from said liquids with the use of the above said fibrous materials, are the starting grapes themselves, the dregs of the pressed grapes, lees, mucilages contained in the musts and in wines, and other similar substances.

The olefin polymers forming the fibrous materials are preferably polyethylene and polypropylene, but may also be polybutene-1, 4-methyl-1-pentene and the ethylene-propylene copolymers.

The fibrous material used for the purposes of this invention may contain (but not necessarily) inorganic material incorporated into the fibers as a filler, for instance kaolin, silica clay, etc., in quantities of up to 70% by weight on the total weight of the filled fibers.

Before using such fibrous material, it is preferable to subject it to a treatment that will make it easily wettable. One of the most common treatments is that of bringing the fibrous material into contact with an aqueous solution or dispersion of a hydrophile product, preferably of the polymeric type, to insure a stable adsorption of this solution by the fibers. Treatments of this type are described, for instance, in German Patent Application No. 2,208,555; in Belgian Pat. No. 787,060 as well as in Italian Pat. No. 1,006,878. The wettability of the fibrous material may be obtained, however, in another way, for instance by modifying the surface of the fibers by means of chemical agents, or by directly adding hydrophilic substances to the olefin polymer, before it is formed into a fibrous product.

As indicated above, the fibrous material is used, for the purposes of this invention, preferably in admixture with the solid products or with the liquid-solid systems from which the liquid phase is to be separated. Considerable advantages, such as for instance a greater separation speed, may be achieved, however, by using the fibrous material as a mass separated from the liquid-solid system, as is preferred for example, in the clarification of the musts of grapes or of fruit juices, fermented or unfermented, by filtering. In this case the must or juice is passed through the pre-constituted mass of fibers, thereby obtaining a separation speed of the solid from the liquid that is greater than that obtainable with the filtering means normally used.

On the contrary, an example of the utilization of the fibrous material in admixture with the solid and liquid phases to be separated, according to this invention, in the separation of fermented wine from its dregs. In this case, one may operate by adding, under stirring, the fibrous material to the liquid-solid mixture, in quantities preferably comprised between 50 and 200 grams per quintal of that mixture and by then separating the wine from the solid mass by drainage.

Particular advantages of using the fibrous material in admixture with the liquid and solid products to be separated are obtained in the separation operations that are carried out by squeezing. In the case of the treatment of fresh or dried grapes, such operations may mainly involve:

(1) the squeezing or squashing of grapes in presses for the preparation of the must, or (2) the squeezing of grape-husks, coming from the fermentation of musts, when said fermentation had been considered in the presence of grape skins and of the other solid or semi-solid constituents of the grapes.

Surprisingly, expecially considering the relatively small amount of fibrous material used, in the grape-squeezing operation, the following advantages are realized:

(a) the obtention of a greater quantity of must of the type "1st Flower";

(b) the obtention of a greater quantity of total must, the squeezing time remaining the same;

(c) reduction of the content in phenolic and ferrous substances in the must, with a considerable advantage for the organoleptic characteristics of the wine;

(d) a considerably clearer must, which facilitates the successive clarification operations of the must itself; and (e) a more controlled and regular fermentation of the must, with a possible reduction of the risks of a premature fermentation during the clarification operations of the musts.

For use in the grape-squeezing operation, the fibrous material is preferably added in quantities comprised between 20 and 150 g (referred to the dry product) per quintal of treated grapes.

In that case, the fibrous material may be added contemporaneously with the grapes into the press or into the squeezing grape press. This addition may be carried out manually in the squeezing equipment so that there may be obtained a homogeneous distribution of the fibrous material among the grapes, or by feeding into said devices the fibrous material homogeneously dispersed in a certain quantity of must.

Advantages substantially analogous to those hereinabove described with regard to the squeezing of grapes, are obtained with the use in admixture of analogous quantities of fibrous material, in the separation by squeezing of the fermented musts from the fermentation grape-husks, as well as in the separation of the fruit juices from the corresponding fruits by squeezing.

As illustrative, the fruits which can be processed in the practice of this invention include, in addition to grapes, pears, apples, peaches, apricots, cherries and bilberries.

The following examples are given for further illustrating the invention and are not intended to be limiting.

EXAMPLE 1

Test (a)

In an electronically controlled, two-plate press of the VASLIN 15 HL type, were subjected to squeezing a total of 1170 kg. of whole grapes, squashed and unstalked, of the "Prosecco" type, to which had been added, in a homogeneous mixture, 1 kg of polyethylene fibers of the following characteristics:

mean length: 0.9–1.2 mm
mean diameter: 15.–20. micron
specific surface area: 4. sq.mt/g The polyethylene from which said fibers are formed has a melt point of 135° C.

The fibers were prepared according to the method described in Italian Pat. No. 947,919, and contained, incorporated therein, about 30% by weight of kaolin powder. Before their use, they were treated with a wetting agent according to the process described in Italian Pat. No. 1,006,878.

The mixing of the fibers with the grapes in the press was carried out manually. Before said mixing, the fibers, originally in the form of a compact mass, were subjected to a suitable bulking process in order to render them more easily dispersible among the grapes.

The following Table gives the squeezing conditions and the results obtained.

TABLE I

|  | Must "1st Flower" | Must "2nd Flower" |
|---|---|---|
| Squeezing pressure (atm) | 1–3 | 4–6 |
| Squeezing time (in minutes) | 32 | 68 |
| Must obtained in Kg. | 845.20 (equal to 72.3% of the wine) | 82.00 (equal to 6.9% of the wine) |

With a squeezing of a total duration of 100 minutes, there were thus obtained 927.20 kg of total must, with a yield of 79.2% by weight of treated grapes.

Test (b)

Using the same machine, 980 kg of the same whole, unstalked and squeezed grapes, without the addition of fibers, was subjected, for comparative purposes, to squashing under the following conditions and with the following results:

TABLE II

|  | Must "1st Flower" | Must "2nd Flower" |
|---|---|---|
| Squeezing pressure (atm) | 1–3 | 4–6 |
| Squeezing time (in minutes) | 43 | 86 |
| Must obtained (Kg.) | 688.00 (equal to 70.2% of the wine) | 76.88 (equal to 7.8% of the wine) |

For a squeezing of a total duration of 129 minutes there have, thus, been obtained 764.88 Kg. of total must, with a yield of 78.0% with respect to the treated grapes. In this case, the must had a much cloudier aspect and a deeper color than in test (a).

Table III records the characteristics of the must fractions obtained in the two tests, after 5, 10, 15 and 20 minutes of squeezing, respectively, as well as the characteristics of the mixture of such fractions and the characteristics of the grape-husks obtained in the two tests.

Table IV records the characteristics of the musts obtained according to tests (a) and (b), determined on a certain date and after one month from that data.

TABLE III

| | Fraction of Must from Grapes Additioned with Fibers - Test (a) | | | | Fraction of Must from Grapes not Additioned with Fibers - Test (b) | | | | Grape-husks from grapes additioned with fibers | Grape-husks from grapes not additioned with fibers |
|---|---|---|---|---|---|---|---|---|---|---|
| | After 5 minutes | After 10 minutes | After 15 minutes | After 20 minutes | After 5 minutes | After 10 minutes | After 15 minutes | After 20 minutes | | |
| Content in polyphenolic substances* (%, by weight) | 725. | 750. | 748. | 760. | 950. | 875. | 909. | 860. | | |
| Content in iron (in mg/lt) | 1.9 | 2.0 | 1.9 | 2.1 | 6.8 | 5.6 | 6.3 | 5.0 | | |
| Mean characteristics of the mixture of the must fractions | | | | | | | | | | |
| Content in reducing sugars (% by weight) | | 14.60 | | | | 14.34 | | | 1.95 | 0.69 |
| Alcohol developed (% b.w.) | | 0.61 | | | | 0.54 | | | 2.23 | 2.22 |
| Global alcohol (% by weight) | | 9.19 | | | | 8.97 | | | 4.18 | 2.91 |
| Content in dry substance (% b.w.) | | 12.53 | | | | 12.69 | | | 33.8 | 28.01 |
| Oxidability index with catechol** | | 1.7 | | | | 3.1 | | | — | — |

*determined by ultraviolet-ray examination
**determined according to method FV/310 O.I.V. of U. Leglise e J. Siegrist

TABLE IV

| | Must of test (a) | Must of test (b) | Must of test (a) after 1 month | Must of test (b) after 1 month |
|---|---|---|---|---|
| Alcohol developed (cc %) | 10.20 | 10.08 | 10.23 | 10.07 |
| Total alcohol (cc %) | 11.33 | 11.09 | 11.31 | 11.02 |
| Reducing sugars in g/lt. | 19.3 | 17.3 | 18.41 | 16.16 |
| pH | 3.20 | 3.29 | 3.24 | 3.33 |
| Dry extract (g/l) | 21.5 | 21.9 | 21.1 | 22.1 |
| Ashes (g/l) | 1.65 | 1.84 | 1.61 | 1.80 |
| Alkalinity of the ashes (mg/l) | 21.64 | 26.8 | 21.30 | 26.5 |
| Iron (mg/l) | 7.5 | 9.8 | 7.6 | 10.6 |
| Acetaldehyde (mg/l) | 41. | 78. | 42. | 81. |
| Oxidability index with catechol | 0.12 | 2.04 | 0.10 | 2.04 |

What is claimed is:

1. A method for separating fruit juice from fruit material containing solids comprising mixing the fruit material containing solids with fibrous materials which are wettable or have been treated to render them wettable and which consist of fibers of an olefin polymer having a surface area of at least 1 m$^2$/g, a mean length of 0.5–5 mm, and a mean diameter of 1 to 500 microns, and separating juice from the mixture of fibrous material and fruit material containing solids.

2. The method of claim 1, wherein the fruit material containing solids consists of fruits, and the separation of the juice from the mixture of said fruits and fibrous material is accomplished by squeezing said mixture.

3. The method of claim 2, wherein the fruits are selected from the group consisting of fresh or dried grapes, pears, apples, peaches, apricots, cherries and bilberries.

4. The method of claim 2, wherein the fibrous materials are used in a quantity comprised between 20 and 150 grams per 100 kilograms of fruits.

5. The method of claim 1, wherein the juice is present in the fermented state.

6. The method of claim 5, wherein the juice consists of grape juice.

7. The method of claim 6, wherein grape-husks are present in the mixture with the fibrous materials.

8. The method of claim 6, wherein dregs are present in the mixture with the fibrous materials.

* * * * *